INVENTOR
F.T. AGRICOLA
BY Henry L. Jennings
ATTORNEY

May 28, 1946.  F. T. AGRICOLA  2,400,900
FURNACE
Filed Aug. 21, 1943  2 Sheets-Sheet 2

INVENTOR
F. T. AGRICOLA
BY *Henry L Jennings*
ATTORNEY

Patented May 28, 1946

2,400,900

UNITED STATES PATENT OFFICE 2,400,900

FURNACE

Frederick T. Agricola, Gadsden, Ala., assignor to Agricola Furnace Company, a corporation of Alabama Application August 21, 1943, Serial No. 499,463

1 Claim. (Cl. 126—77).

This invention relates to coal burning, household heaters, furnaces, automatic stokers and the like; particularly to a means for supplying air for combustion thereto and has for an object the provision of a device of the character designated which shall be adapted to cause air for combustion to be concentrated in an area bordering the outer boundary of the combustion space whereby to heat the radiating walls of the heater more efficiently, reduce heat loss, and conserve fuel.

A further object of my invention is to provide an air supply manifold for a fuel burning device in which air for combustion is caused to flow tangentially into the combustion space near the wall of the heater or furnace in which the device is incorporated, thereby to maintain a zone of intense combustion near the wall of the heater and a relatively cooler zone inwardly of the combustion space.

A still further object of my invention is to provide an air supply manifold for use with a stoker furnace or heater which shall be adapted to provide a zone of intense combustion around the outer wall of a fire pot to aid in fusing the ash as it is formed and in the formation of a clinker.

In my prior Patent No. 2,212,724, dated August 27, 1940, I show, describe and claim a stoker furnace embodying an air manifold mounted in the fire pot and extending around and spaced from a fuel supply duct, said manifold having radial air passages therein through which all the air for combustion passes radially inward of the furnace. While the apparatus therein disclosed has proven eminently satisfactory in service, I have found that more efficient combustion can be obtained and less heat loss sustained by so constructing the air supply manifold as to cause the air to be discharged obliquely into the combustion space, thus limiting the area and intensifying the rate at which combustion occurs. By intensifying the rate of combustion, fusing of the ash as it is formed is insured and the clinker thus produced may be readily removed. Furthermore, by introducing the air for combustion obliquely into the combustion space near the wall of the heater, there is less heat loss through the center of the fire pot and out through the flue of the furnace or heater.

Figure 1:
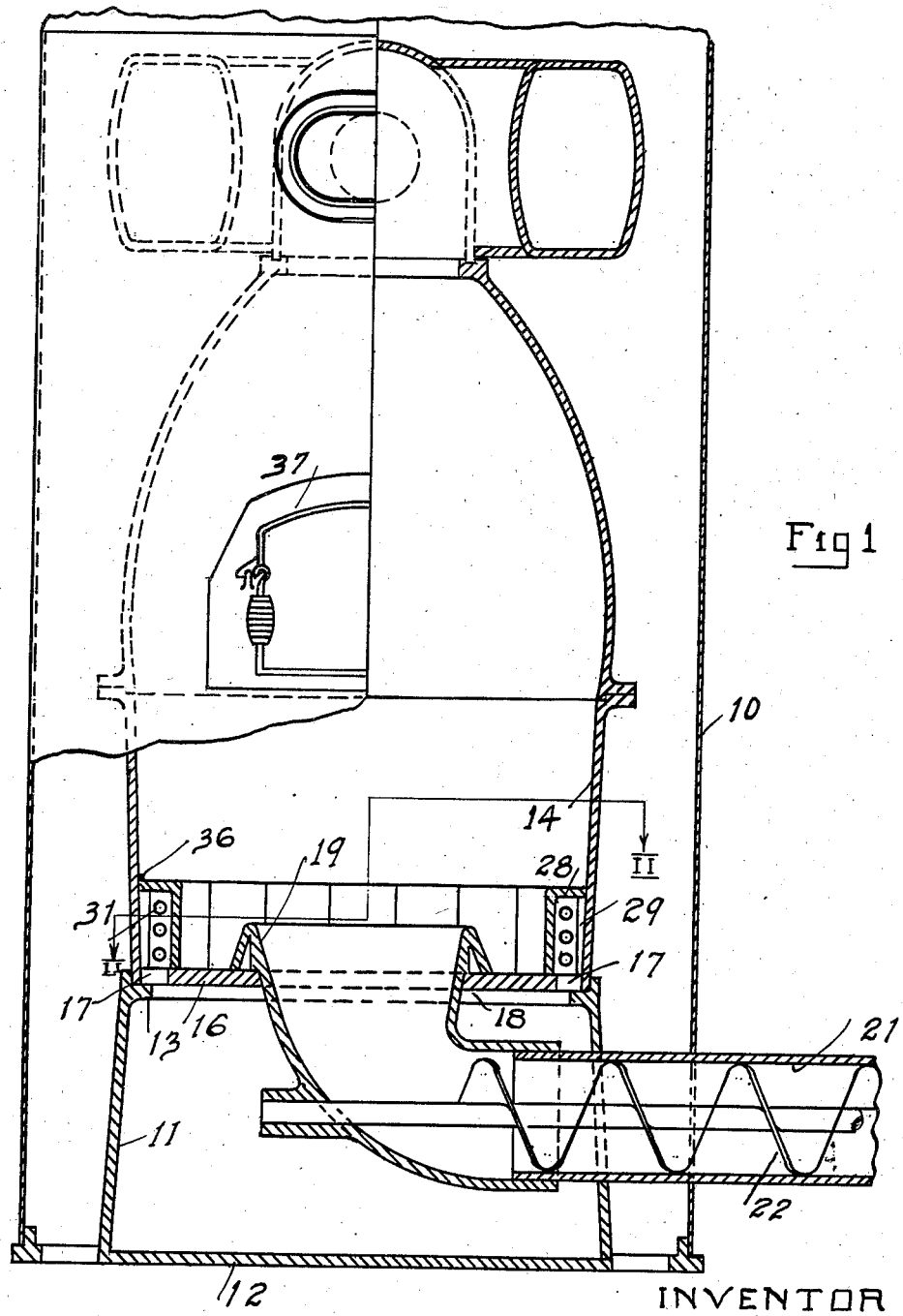

Apparatus embodying features of my invention is illustrated in the accompanying drawings, forming a part of this application, in which Fig. 1 is a sectional elevation of a stoker fired furnace having my improved air supply manifold incorporated therein.

Figure 2:
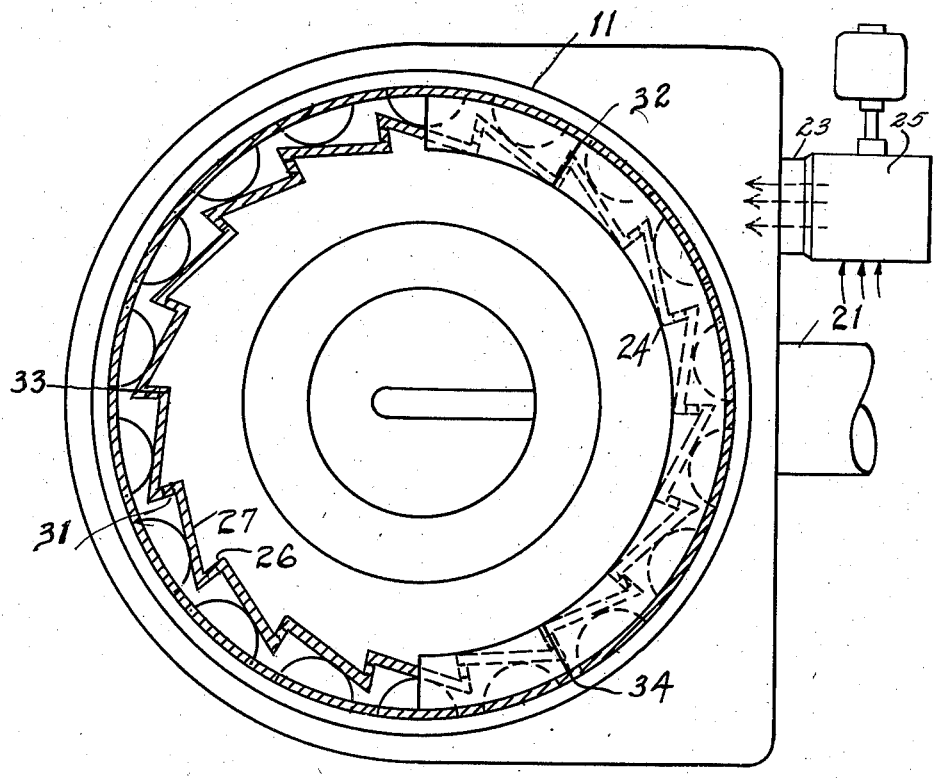
Figure 3:
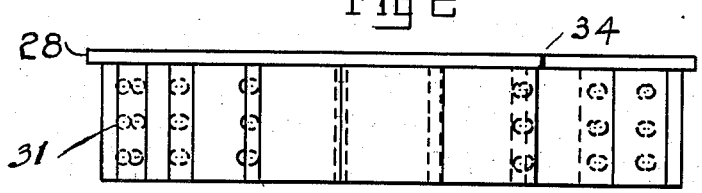

Fig. 2 is a sectional plan view looking in the direction of the arrows 11—11 in Fig. 1, and Fig. 3 is an elevational view of the air supply manifold removed from the furnace.

Referring to the drawings for better understanding of my invention, and particularly to the embodiment disclosed in Figs. 1 and 2, I show a conventional type of heating furnace comprising an outer casing 10 and an ash pit 11. The ash pit is closed below by a bottom wall 12 and has a marginal top flange 13 upon which is snugly supported the bottom and of a tapered fire pot 14. A bottom plate 16 fits snugly into the lower end of the fire pot to close it and is provided with marginal ports 17 and a central fuel supply opening 18. As used herein the term "plate" is intended to define either a solid plate or a grate ring. Extending upwardly through the opening 18 is an upwardly flaring fuel supply conduit 19, the lower end of which is turned outwardly and connects to a conduit 21 in which is located a feed screw 22, driven by any suitable means, not shown. Also connected to the ash pit 11 is an air supply conduit 23, through which air for combustion is supplied under pressure from any suitable source, such as the blower 25 shown in Fig. 2.

The heater so far disclosed is similar to that shown in my before-mentioned prior Patent No. 2,212,724. The difference between my present invention and that described in my prior patent resides in the manner of supplying air for combustion to the fire pot 14. In accordance with my present invention, I provide an air manifold comprising an inner wall 24 which is serrated to provide alternate radial portions 26 and portions 27 extending obliquely to the wall of the fire pot 14. An upper flange 28 is joined to the inner wall 24 and extends outwardly to form a snug fit with the wall of the fire pot 14. As shown in the drawings, the flange 28 is of sufficient width to provide a passage 29 all around the manifold between the inside of the wall 24 and the wall of the fire pot. Extending through the radial portions 26 of the wall 24 are a plurality of air supply ports 31 through which air for combustion is discharged into the fire pot tangentially and along the oblique wall portions 27, so that combustion is maintained around the outer wall of the fire pot.

In the practical manufacture of my improved air manifold, it may conveniently be made in a plurality of segments joined together as at 32, 33 and 34 by cement when the manifold is mounted in a heater. See Figs. 2 and 3. Also, the flange 28 should be cemented to the wall of the fire pot 14 as shown at 36 in Fig. 1 so that all the air entering the fire pot will be discharged through the ports 31 in the radial wall portions 26. From a consideration of Figs. 1 and 2 it will be seen that fuel supplied to the heating apparatus through the fuel supply conduit 19 will be burned by reason of the air supplied along the oblique walls 27 of the manifold so that a zone of intense combustion is maintained near the outer wall of the heater. I have found that this method of supplying air greatly reduces heat losses through the stack of the furnace and greatly increases the efficiency of the furnace by supplying heat directly to the outer wall of the fire pot. With stoker fired furnaces such as illustrated in Figs. 1 and 2 of the drawings, the intense heat in the zone of combustion around the fire pot insures that the ash will be fused as it is formed, thus producing a clinker which can readily be removed at intervals through the door 37.

While I have shown my invention in but one form, it will be obvious to those skilled in the art that it is not so limited, but is susceptible of various other changes and modifications within the spirit thereof and I desire therefore that only such limitations shall be placed thereupon as are specifically set forth in the appended claim.

What I claim is:

In a heater having a fire pot in the lower portion thereof, an air supply manifold comprising an inner serrated annular wall spaced from the wall of the fire pot and having alternating radial portions and portions extending obliquely to the wall of the fire pot, air supply ports formed in the radial portions directed inwardly along the obliquely extending portions, an overhanging outwardly extending flange on the inner wall joined to the wall of the heater to form an air passage around the fire pot a plate closing the bottom of the fire pot and having a central fuel supply opening therein and having marginal ports communicating with the air passage, a fuel supply conduit extending upwardly through said opening, means to supply fuel through said conduit centrally of the air supply manifold, means forming an air supply chamber beneath the plate and communicating with the air passage through the marginal ports, and means to supply air for combustion to said chamber.

FREDERICK T. AGRICOLA.